United States Patent
Balasubramanian et al.

(10) Patent No.: US 11,758,012 B1
(45) Date of Patent: Sep. 12, 2023

(54) COMPUTER SERVICE INVOCATION CHAIN MONITORING AND REMUNERATION OPTIMIZATION

(71) Applicant: International Business Machines Corporation, Armonk, NY (US)

(72) Inventors: Swaminathan Balasubramanian, Troy, MI (US); Rajiv Joshi, Yorktown Heights, NY (US); Renganathan Sundararaman, Cary, NC (US); Pierre C. Berlandier, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/098,172

(22) Filed: Jan. 18, 2023

(51) Int. Cl.
*H04L 67/51* (2022.01)
*G06N 7/01* (2023.01)

(52) U.S. Cl.
CPC .............. *H04L 67/51* (2022.05); *G06N 7/01* (2023.01)

(58) Field of Classification Search
CPC ................................ H04L 67/51; G06N 7/01
USPC .......................................................... 709/203
See application file for complete search history.

(56) References Cited

U.S. PATENT DOCUMENTS

| | | | |
|---|---|---|---|
| 6,938,044 B1 | 8/2005 | Milby | |
| 7,613,817 B2 | 11/2009 | Eibach et al. | |
| 7,792,878 B2 | 9/2010 | Dettinger et al. | |
| 8,055,586 B1 | 11/2011 | Sirota et al. | |
| 8,150,736 B2 * | 4/2012 | Horn | G06Q 30/06 715/201 |
| 8,195,566 B2 | 6/2012 | Tsui et al. | |
| 8,560,462 B2 * | 10/2013 | Amir | G06Q 30/02 705/400 |
| 8,930,541 B2 * | 1/2015 | Assuncao | G06F 9/50 709/212 |
| 10,726,404 B2 | 7/2020 | Sirota et al. | |
| 2002/0068545 A1 | 6/2002 | Oyama et al. | |
| 2004/0267645 A1 | 12/2004 | Pollari | |
| 2005/0086102 A1 * | 4/2005 | Harrison | G06Q 30/0281 705/346 |
| 2013/0212160 A1 * | 8/2013 | Lawson | G06F 16/9535 709/203 |

(Continued)

OTHER PUBLICATIONS

Fitzsimmons, Optimizing Service Delivery, crmproject.com, archived May 1, 2001 (8 pages) (Year: 2001).*

*Primary Examiner* — Wing F Chan
*Assistant Examiner* — Leon Y Tseng
(74) *Attorney, Agent, or Firm* — Stephen J. Walder, Jr.; Aaron Portikos (57) ABSTRACT

Mechanisms are provided for optimizing remuneration for computing services. Computing services are registered which stores registration data comprising remuneration associations between computing services and consumers. A hierarchical computer model is generated based on the registration data, where the model represents dependencies between consumers and providers of computing services. For a service request from a consumer, each transaction with each computing service in a service invocation chain associated with the service request is identified and a cost of each transaction is calculated. The calculated cost of the service invocation chain is optimized based on applying an optimization algorithm to a cost function applied to a selected portion of the hierarchical computer model corresponding to the service invocation chain.

20 Claims, 4 Drawing Sheets

(56) References Cited

U.S. PATENT DOCUMENTS

2014/0089105 A1 3/2014 Douglas et al.
2016/0247151 A1 8/2016 Gupta et al.

* cited by examiner

COMPUTER SERVICE INVOCATION CHAIN MONITORING AND REMUNERATION OPTIMIZATION

BACKGROUND

The present application relates generally to an improved data processing apparatus and method and more specifically to an improved computing tool and improved computing tool operations/functionality for automatically monitoring a computer service invocation chain and identifying and implementing an optimized remuneration operation based on the monitoring.

Many modern computer applications, especially those implemented in distributed data processing systems, such as wide area networks (WANs), e.g., the Internet, are composed of a plurality of computer services with Application Programming Interfaces (APIs) specifying the set of functions and procedures for creating applications that can access the features or data of an operating system, application, or other service. APIs is a software interface that allows two or more computer programs to communicate with each other and thereby allow one computer program to offer services that another computer program may take advantage of. Many times, API developers make the API available on a subscription basis such that consumers of the API subscribe to the API service.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method for optimizing remuneration for computing services is provided. The computer-implemented method comprises registering a plurality of computing services with a service invocation chain optimized remuneration (SICOR) computing tool. The registering, for a computing service, comprises storing registration data comprising remuneration associations between the computing service and at least one of consumers or other computing services. The method further comprises generating, by the SICOR computing tool, a hierarchical computer model based on the registration data for the plurality of computing services. The hierarchical computer model represents dependencies between consumers of computing services and providers of computing services. The method also comprises determining, by the SICOR computing tool, for a service request from a consumer, each individual transaction with each individual computing service in a service invocation chain associated with the service request. In addition, the method comprises calculating, by the SICOR computing tool, a cost of each individual transaction of the service invocation chain associated with the service request. Moreover, the method comprises optimizing the calculated cost of the service invocation chain associated with the service request based on applying an optimization algorithm to a cost function applied to a selected portion of the hierarchical computer model corresponding to the service invocation chain.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As noted above, Application Programming Interface (API) developers make the API available on a subscription basis such that consumers of the API subscribe to the API service. In some cases, APIs may be dependent on other APIs, however visibility of these dependencies are only at a single level. This means that a consumer can only see the APIs they subscribe to, but not the downstream dependencies, e.g., if the consumer subscribes and sees API.1, the consumer may not be aware that API.1 has further downstream dependencies on, i.e., utilizes the services of, API.2, API.3, and a backend database B. Moreover, API providers can only see their subscribers but do not see upstream dependencies, e.g., in the above example, API.3 provider may be able to see API.2 provider's subscription to API.3, but does not see API.1 or the consumer of API.1. That is, as an example, assume that there is a service invocation chain of APIs as follows:

Application A (consumer)→API.1→API.2→API.3→
   Backend B

In this example, API.2 can only see its consumer (API.1) and the APIs to which API.2 is a subscriber, e.g., API.3.

Thus, computer service invocation chains, e.g., API services consumer-provider invocation chains, are extremely opaque. This makes remuneration for services inefficient as there may be instances where consumers are experiencing higher than necessary costs or even incurring costs multiple times for the same service.

The illustrative embodiments described herein provide an improved computing tool and improved computing tool operations/functionality for automatically monitoring a computer service invocation chain and identifying and implementing an optimized remuneration operation based on the monitoring. The illustrative embodiments implement a distributed database computing system to record each computer service consumer/provider interaction within a service invocation chain. The recorded data of the consumer/provider interactions are than processed based on a directed acyclic graph (DAG) of service nodes and their corresponding associations (edges) with each other to identify the service nodes involved in a service invocation chain. A remuneration optimization operation is then performed on the portions of the DAG having the identified service nodes and corresponding associations so as to minimize costs for traversing from a first node of the service invocation chain to a final node of the service invocation chain. The nodes involved in the service invocation chain are then automatically sent notifications to update their usage metrics and cost metrics based on the optimization results.

As discussed above, with modern applications, computer service invocation chains are often implemented to facilitate providing the needed functionality for implementing the application. These computer service invocation chains may be many levels deep with regard to one computer service subscribing to another computer service, which in turn subscribes to yet another computer service, until a final computer service or backend computing system, e.g., database or the like, is reached for the invocation chain. However, in this invocation chain, each particular computer service can only see or know the particular information about the consumers of that particular computer service and the computer services for which the particular computer service is a consumer, e.g., can only see one level deep either upstream or downstream from the particular computer service. This opaqueness may cause inefficiencies in remuneration for the computer services resulting in excess costs for consumers.

For example, using the previous computer service invocation chain set forth above, i.e., Application A (consumer)→API.1→API.2→API.3→Backend X, as an example, Application A may be charged a subscription fee to access API.1 but indirectly may be paying for API.2/API.3/Backend X. For example, Company A (provider of Application A) may be paying Shipping Company B (provider of API.1) to use their APIs so that Company A can show the order status (a service provided by Shipping Company B, e.g., API.2) to Company A's customer (consumer of Application A). However, if Company B uses a computer mapping service, e.g., Google Maps™ (a trademark of Google, LLC), then that cost is passed on to Company A. If Company A has a direct arrangement, e.g., a subscription or contract with, the computer mapping service, Company A may be paying twice to use the computer mapping service, e.g., the direct subscription to the computer mapping service and the built in costs for the service from Company B (which includes the cost to Company B for using the computer mapping service). Thus, the consumer, Company A is incurring additional costs for the same computer service, and these costs are ultimately passed on to the consumer of Company A's services.

The illustrative embodiments provide automated improved computing tools for monitoring and tracking computer service invocation chains in a distributed manner and identify instances where inefficiencies in computer service remuneration may be present. The illustrative embodiments provide improved computer functionality that automatically optimizes this remuneration where such inefficiencies are detected so as to minimize costs to consumers of such computer services.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 1:
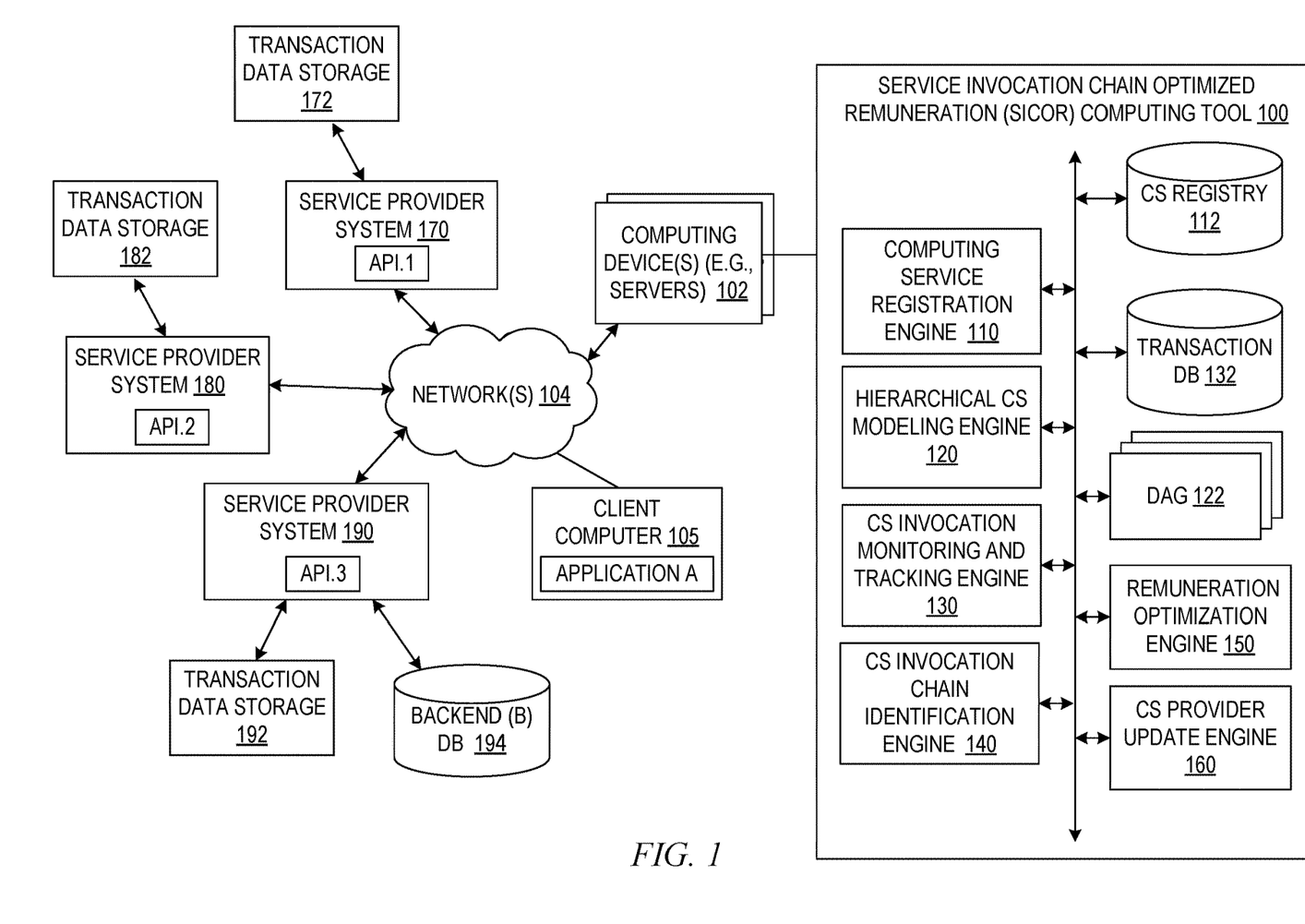
FIG. 1 is an example diagram illustrating the primary operational components of a service invocation chain optimized remuneration (SICOR) computing tool in accordance with one illustrative embodiment.

As noted above, the illustrative embodiments provide specific improvements to computer functionality and provide an improved computing tool that is specifically directed to automatically monitoring computer service invocation chains and optimizing remuneration to the providers of these computer services that minimizes costs to consumers of these computer services based on identified inefficiencies. FIG. 1 is an example diagram illustrating the primary operational components of a service invocation chain optimized remuneration (SICOR) computing tool in accordance with one illustrative embodiment. It will be assumed, for purposes of this description of the illustrative embodiments, that the computer services are implemented using application programming interfaces (APIs) provided by API providers via their computing systems, and that different APIs may be provided by different API providers via different computing systems. It should be appreciated that the mechanisms of the illustrative embodiments are not limited to computer services provided via APIs, but may be applicable to any currently existing or later developed mechanism for providing computer services to consumers of those computer services via any suitable computer mechanism.

As shown in FIG. 1, the SICOR computing tool 100 includes a computer service registration engine 110, a hierarchical computer service modeling engine 120, a service invocation monitoring and tracking engine 130, a computer service invocation chain identification engine 140, a remuneration optimization engine 150, and a computer service provider update engine 160. The computer service registration engine 110 generates computer service registry entries in a computer service registry database 112 for computer services as a preliminary operation. The hierarchical computer service modeling engine 120 generates one or more hierarchical computer models of the computer services, which for purposes of this description are shown as directed acyclic graphs (DAGs) 122, based on the computer service registry entries in the computer services registry database 112. While DAGs 122 will be used as examples of hierarchical data structures that are used to represent the computer services and their associations and dependencies, the illustrative embodiments are not limited to such and any other hierarchical data structure or computer model that is capable of capturing the computer services and their associations/dependencies may be used without departing from the spirit and scope of the present invention. For example, an alternative computer model may be blockchain based ledgers, where such a model has the benefit of being distributed with a native consensus mechanism for updates. However, traversing such a model is comparatively inefficient, and does not scale as well, when compared to a DAG based model. For these reasons, the DAG model was chosen as a preferred embodiment, but the blockchain based ledger may still be utilized if desired for the particular implementation.

The SICOR computing tool 100 may be provided on one or more computing devices 102, such as one or more server computing devices, which may be third party computing devices, or may be integrated with one or more of the service provider computing devices 170, 180, 190, or even a consumer computing device 105. In the depicted example, the SICOR computing tool 100 is provided as part of a third party service on one or more third party server computing systems 102.

As part of a pre-configuration operation, i.e., an operation for setting up a configuration of the SICOR computing tool 100 for use with transactions between consumer computing systems and one or more computer services, e.g., APIs, of a distributed data processing system, computer services are registered with the SICOR computing tool 100 via the computing service registration engine 110. That is, computer service providers, e.g., API providers, register their computer services with the SICOR computing tool 100 by providing data structures specifying the capabilities, constraints, and costs (also referred to herein as registration data) associated with the computer service provided, as well as the computer services that this computer service is a consumer of, i.e., the next level of downstream computer services that this computer service has an association with, and the conditions of those associations. For example, these data structures may specify the cost data for the computer service, the maximum number of API calls per second permitted by the computer service, the cost per API call, the compute/storage costs, and the like. This information may be provided in data structures corresponding to each computer service and each other computer service that the current computer service is directly associated with. For purposes of the description of the example illustrative embodiments provided herein, it will be assumed that these computer services are APIs.

Thus, as an example, if a first API, i.e., API.1, has an association with a second API, i.e., API.2, then during a pre-configuration operation, API.1 may register with the SICOR computing tool 100 via the computer service registration engine 110 and provide data structures specifying the capabilities, constraints, and costs of service by API.1 to its consumers. This registration data may also specify such capabilities, constraints, and costs of other computer services, e.g., API.2, that this computer service API.1 has associations with, e.g., contract data between the provider of API.1, and the provider of API.2, which may be stored as contract data structures on the service provider computer systems for providers of API.1 and API.2.

These registration data structures may be provided by each service provider for each of the computer services that they provide and for the services that they consume. As a result, the registration data specifies the two levels of computer service hierarchy that the particular computer service, e.g., API, is able to "see", i.e., the levels for which that computer service has information. Thus, if the API consumes other APIs or other computer services, then that information will be maintained by the API's provider and used to populate the registration data along with the information about the API itself that it uses for its own consumers. Hence, for example, if API.1 170 is consumed by application A on a consumer computing system, e.g., client computing system 105, the registration data for API.1 170 will specify what its capabilities, constraints, and costs are that it has for application A as a consumer of API.1, e.g., a maximum number of API calls per second, a cost per API call, any limits on compute/storage resource usage, a compute/storage cost, etc. In addition, if API.1 170 is a consumer of other computing services, e.g., API.2 180, then the registration data for API.1 170 may include a specification of similar capabilities, constraints, and costs for each computing service that API.1 170 is a consumer of. In this way, the registration for data one level higher in the hierarchy of computer services, and one level lower in the hierarchy of computer services, is specified for each computer service, e.g., API, that is registered with the SICOR computing tool 100.

The computer service registration engine 110 provides interfaces through which such computer services may be registered with the SICOR computing tool 100 either through manual or automated operations. That is the computer service registration engine 110 may provide graphical user interfaces (GUIs) through which a human user associated with a service provider may use their computing systems 170, 180, 190, to register the computing services, e.g., APIs, that they provide with the SICOR computing tool 100. Alternatively, this registration process may be automated such that the service provider computing systems 170, 180, 190 may communicate with the computer service registration engine 110 automatically and exchange registration data based on the execution of logic of the computer service registration engine 110.

The computer service registration engine 110 may generate, based on the registration data collected, one or more entries in the computer service registry 112. Each entry in the one or more entries may be associated with a different computer service and may specify the registration data including hierarchical information regarding the dependencies between computing services as determined from the registration data. Unique identifiers may be associated with each of the entries, and thus, each of the computer services, which the SICOR computing tool 100 may use to monitor and track transactions occurring between entities, e.g., consumers of computing services and providers of computing services, in the distributed data processing system via network 104 and the computing systems that communicate via the network 104, which may comprise one or more of a wired, wireless, or hybrid data network.

There may be multiple unique identifiers associated with each computing service, which correspond to associations between consumers and providers of computing services. That is, each computing service may have a unique identifier associated with each of its consumers. These unique identifiers may correspond to the particular association between the computing service and its consumer such that each consumer may be uniquely identified. For example, if API.1 consumes (uses) API.2 to perform some functionality provided by API.1, e.g., a computer mapping service used by API.1 to identify a status of a customer's order, then the API.2 will assign a unique identifier to API.1 for the association between API.1 and API.2 and provide this unique identifier to API.1 for use when calling API.2. Thus, a consumer may have multiple different unique identifiers for each of the computing services that they consume (use).

The same is true of consumers such as application A on consumer system 105. That is, consumers such as application A may have multiple different unique identifiers associated with it and these unique identifiers may be reported by computing service to the SICOR computing tool 100 as part of the registration data. In some cases, the consumers themselves, e.g., application A, may pre-register with the SICOR computing tool 100 in a similar manner as the computing services and may have their own entry in the computing service registry 112, but with some data not populated as these consumers only operate as consumers and do not themselves provide any computing service. Similarly, for some computing services, e.g., API.3 on service provider system 190, which have other backend systems that they utilize, e.g., backend databases, such as database B 194, may specify such consumed computing resources as part of the registration data.

As part of the pre-configuration operation, the computing service registry 112 entries are processed by the hierarchical computing service (CS) modeling engine 120 to generate one or more computer models 122 to represent the hierarchical associations of computing services and consumers of computing services. In the depicted example, these one or more computer models 122 are directed acyclic graphs (DAGs) in which nodes represents an entity, e.g., computing services and their computing devices, consumers and their computing devices, backend computing resources, and the like. Edges between nodes of the DAG represent associations between entities as defined by the registration data specified in the computing services registry 112. In some illustrative embodiments, these edges represent digital contracts between the entities specifying the capabilities, constraints, and costs associated with a consumer utilize the computing services of a computing service provider. Again, these may specify such data as maximum number of API call per time period, cost per API call, compute/storage resource limitations and costs, etc.

Thus, the hierarchical CS modeling engine 120 may operate as part of the pre-configuration operation to build one or more initial computer models to represent these computing services and their associations, e.g., consumer-provider associations. In addition, as new computing services are registered with the SICOR computing tool 100 via the computer service registration engine 110, or as registrations are updated via the computer service registration engine 110, the computer service registration engine 110 may inform the hierarchical CS modeling engine 120 of such changes to the CS registry 112 and thereby cause the hierarchical CS modeling engine 120 to update the computer model(s) 122 accordingly. Thus, the computer model(s) 122 may be dynamically modified as changes to computing services are encountered.

As shown in FIG. 1, each of the service provider computing systems 170, 180, and 190 maintain a corresponding transaction data storage 172, 182, and 192 which has data structures storing data specifying the transactions the corresponding computing service engages in with either consumers or with computing services that the service provider's computing services consume. Thus, for example, the service provider system 170 for API.1 will maintain a transaction data storage 172 that stores entries for transactions between consumers of API.1 and for other computing services that API.1 uses, e.g., API.2. These transactions use the unique identifiers that are assigned to the entities. Thus, the unique identifier for application A assigned by API.1 will be used to identify the transaction between Application A and API.1 in the transaction data storage 172 when application A makes a computing service invocation. Similarly, when API.1 calls API.2 to utilize its functionality to perform an operation, the computing service invocation of API.2 causes a corresponding transaction to be registered in transaction data storage 172 and transaction data storage 182 using the unique identifier assigned by API.2 to API.1.

Each interaction between a consumer of computing services and a provider of computing services generates transaction data including, but not limited to, unique identifiers of the parties (consumers/providers), transaction data (with appropriate redactions to mask sensitive information), and any generated messages/errors. The SICOR computing tool 100 uses a distributed data store wherein each transaction data storage 172, 182 and 192, and transaction database 132, represent nodes of a blockchain network. Each transaction block gets committed at the originating storage 172, 182 or 192, at all participating nodes, and within the transaction database 132.

The CS invocation monitoring and tracking engine 130 monitors the computing services of computing service provider computing devices 170, 180, and 190 and identifies invocations of the computing services. This identification may be based on notifications sent from the computing devices 170, 180, 190 to the SICOR computing tool 100 in response to the computing devices 170, 180, 190 receiving an invocation of the corresponding computing services that these computing devices 170, 180, and 190 offer. These notifications may comprise transaction data for the invocation from the viewpoint of the computing service invoked, e.g., if application A invokes API.1, then service provider computing system 170 may send a notification to the SICOR computing tool 100 comprising transaction data from transaction data storage 172 indicating a unique identifier of application A assigned by API.1, and may also provide a unique identifier of API.1 for downstream computing services, e.g., API.2, that API.1 may invoke. In some illustrative embodiments, only the unique identifier of the consumer that invoked the computing service is provided in the transaction data, with subsequent downstream computing services that are invoked sending their own notifications in response to receiving invocations, e.g., calls to their APIs.

Thus, CS invocation monitoring and tracking engine 130 may collect the transaction data from the various computing service provider computing systems 170, 180, and 190 into a transaction database 132. Entries in the transaction database 132 may comprise, for example, the unique identifier of the consumer, the computing service invoked, relevant timestamp data for the transaction, and other transaction data that may be used for monitoring and tracking computing service invocations as part of invocation chains. These entries in the transaction database 132 may be added to the database 132 as notifications are received from the service provider computing systems 170, 180, and 190. The entries in the transaction database 132 may be used to generate computing service (CS) invocation chains based on the unique identifiers of the consumers and the registration data in the CS registry 112 as well as the hierarchy specified in the DAGs 122. That is, once the computing service invocation chain's operation is completed, e.g., API.1 sends an operation complete notification back to the consumer (e.g., Application A), this completion notification may be sent to the SICOR computing tool 100 which triggers the SICOR computing tool 100 generating the CS invocation chain and optimizing the remuneration of the invoked computing services by minimizing costs to consumers in portions of the invocation chain where inefficiencies may be identified.

In some illustrative embodiments, rather than receiving notifications from each of the computing service provider systems 170, 180, and 190, a blockchain technology may be utilized for each initial invocation of a computing service by a consumer, e.g., Application A on consumer computing system 105. That is, a blockchain data structure may be generated when Application A initiates an invocation of the first computing service, e.g., API.1, where the blockchain stores the transaction data for the invocations in an immutable manner and is passed from one computing service provider computing system 170, 180, and 190 to the other along with the invocation of the computing services. The blockchain therefore stores, among other data, the unique identifiers of consumers of computing services and identities of the computing services consumed as part of the overall operation, with entries to the blockchain being added by each computing service provider computing system 170, 180, and 190 as they are invoked, i.e., for each transaction in the invocation chain. In this way, the blockchain automatically generates an invocation chain data structure which is reported to the SICOR computing tool 100 when providing the blockchain to the SICOR computing tool 100 at completion of the operation.

For example, the transaction database 132 may store transactions as immutable blocks within a blockchain network. Each consumer or provider may execute multiple transactions that represent multiple instances of the same interaction chain, or different interaction chains. Therefore, it is necessary to traverse the blockchain network to identify blocks related to a single instance of an invocation chain. In one illustrative embodiment, the originating transaction (Application A→API 1) is packaged, timestamped, and sent to a queue, called mempool. This operation also produces a transaction "hash" (unique transaction identifier) that is returned back to the participants (consumer and provider). Use of the transaction hash ensures that the invocation chain can be identified precisely during traversal irrespective of whether all the transactions of the chain end up within the same block or different blocks.

The CS invocation chain identification engine 140 provides logic, in some illustrative embodiments, for composing the CS invocation chains based on the transaction data in the transaction database 132, the registration data in the CS registry 112, and the hierarchical arrangement of computing services and their associations as specified in the DAGs 122. That is, when an operation is completed, i.e., when the original consumer, e.g., Application A, receives an operation completion notification, this operation completion notification may be likewise intercepted or otherwise provided to the SICOR computing tool 100, such as by the CS invocation monitoring and tracking engine 130. The receipt of this operation completion notification causes the CS invocation monitoring and tracking engine 130 to initiate operation of the CS invocation chain identification engine 140 to compose the invocation chain from the collected transaction data in the transaction database 132. This invocation chain composing operation involves inferring the CS invocation chain based on linkages of unique identifiers of consumers, identifiers of CS consumed, and the like, in the transaction data entries of the transaction database 132.

For example, a first transaction data entry may specify the unique identifier of Application A as a consumer of API.1, as well as the identification of API.1 as the consumed computing service, may be used to identify a first link in the chain from Application A to API.1. A second transaction data entry may specify that API.2 was invoked by API.1 based on the unique identifier of API.1 assigned by API.2 as specified in the transaction data. A third transaction data entry may specify that API.3 was invoked by API.2 based on the unique identifier of API.2 assigned by API.3 as specified in the transaction data. Thus, a chain from Application A to API.1 to API.2 to API.3 is composed based on the unique identifiers and transaction data.

In some cases, the invocation chain itself may be pre-registered in the computing service registry 112, or the computing service registry 112 may be updated as invocation chains are composed so as to register these invocation chains for subsequent use. That is, as invocation chains are composed by the CS invocation chain identification engine 140, these invocation chains may be registered in the CS registry 112 and retrieved by the CS invocation chain identification engine 140 when evaluating subsequent CS invocations by consumers. For example, the identifier of the consumer may be used to retrieve the registered CS invocation chains that have been previously invoked by this consumer and may be matched to one or more transaction data entries of the transaction database 132 to thereby make CS invocation chain identification faster and more efficient.

Having composed or identified the CS invocation chain for the operation, the remuneration optimization engine 150 operates on the CS invocation chain, based on the DAGs 122, to identify inefficiencies in remuneration based on associations between computing services to thereby minimize costs to consumers of computing services. That is, the remuneration optimization engine 150 first identifies each of the nodes in the DAGs 122 that participate in the CS invocation chain and selects these nodes as a subset of nodes for the CS invocation chain. A cost function $c(i, j)$ is defined that represents the cost of traversing from node ni to node nj in the selected subset of nodes. For example, i may be API.1 and j may be API.2, such that $c(i, j)$ is then the cost of traversal, meaning the cost associated with API.1 calling API.2. The remuneration optimization engine 150 then performs a cost optimization operation which, in some illustrative embodiments, utilizes a traveling salesman approach, applied to the selected subset of nodes. The traveling salesman approach applied to the cost function for nodes in the selected subset of nodes finds the least cost path between nodes i and j in the selected subset of nodes.

The links or associations between each node along the least cost path may be identified and correlated with the corresponding registration data for those associations between consumers and providers of computing services, e.g., allowed API calls per unit time, cost per API call, compute/storage costs, etc. The registration data provides a basis for generating a cost for the transaction corresponding to each link of the least cost path, e.g., a cost per API call for the link between one node and the next in the least cost path. For example, if there is a link from API.1 to API.3 in the shortest path, rather than having to go through API.2, then the cost associated with the association between API.1 and API.3 will be used instead of the costs for going from API.1 to API.2 and then to API.3, if this results in a lower cost to the consumer, e.g., API.1.

Thus, instances of inefficiencies, e.g., portions of the CS invocation chain where a consumer may incur additional costs unnecessarily due to its own associations with computing service providers that other computing services invoke in the invocation chain, may be identified. For example, if API.1 has its own association with API.3, e.g., a previously established contractual arrangement between API.1 and API.3, and API.1 invokes API.2 which in turn invokes API.3, then it is possible that API.1 in providing remuneration to API.2 may be incurring additional costs as the provider of API.1 already remunerates the provider of API.3 in accordance with the established association with API.3. Thus, in remunerating API.2, which passes its own costs for invoking API.3 to its consumers, would cause API.1 to incur additional costs for the invoking of API.3. Instances of such inefficiencies may be automatically identified by the remuneration optimization engine 150 through the solution of the optimization problem, and solved so as to reduce the cost function $c(i,j)$, resulting in the least cost to consumers of computing services.

Having identified the least cost path within the selected subset of nodes, and the costs for the links from node to node along the least cost path, the CS provider update engine 160 updates the usage metrics used by the actual nodes involved in the actual CS invocation chain to reflect the least cost path. That is, the registration data for the links in the least cost path are used to update the usage metrics of the actual nodes in the CS invocation chain so that they will use the registration data for the least cost path where appropriate. For example, in the example of API.1 having an association with API.3 and API.2 also having an association with API.3, in a CS invocation chain of API.1 to API.2 to API.3, the usage metric information for API.2 will be updated to use the registration data for the association from API.1 to API.3 for this operation. Thus, rather than API.2 charging API.1 its own association costs for API.3, API.2 will use the costs of the association of API.1 with API.3. In this way, API.1 will not incur additional costs. Stated another way, if API.2's costs are API.2 costs=API.2's operational costs+API.2 to API.3 costs+API.2 to Backend B's costs, then without the mechanisms of the illustrative embodiments, these are the costs that API.2 would charge API.1, i.e., API.2 costs would be charged. However, if API.1 has a better cost arrangement with API.3, then the API.2 to API.3 costs would be replaced with the API.1 to API.3 costs of this better arrangement. API contracts are remunerated based on usage. Thus, if a more optimized path exists (such as API.1→API.3 vs API.1→API.2→API.3), the illustrative embodiments notify the API.3 service provider to update their usage metrics such that the usage API.2→API.3 is replaced by usage API.1→API.3 (although it was API 2 that called API.3 in order to service API.1). This reduces the cost of API.2, and charges API.1→API.3 directly.

Figure 2:
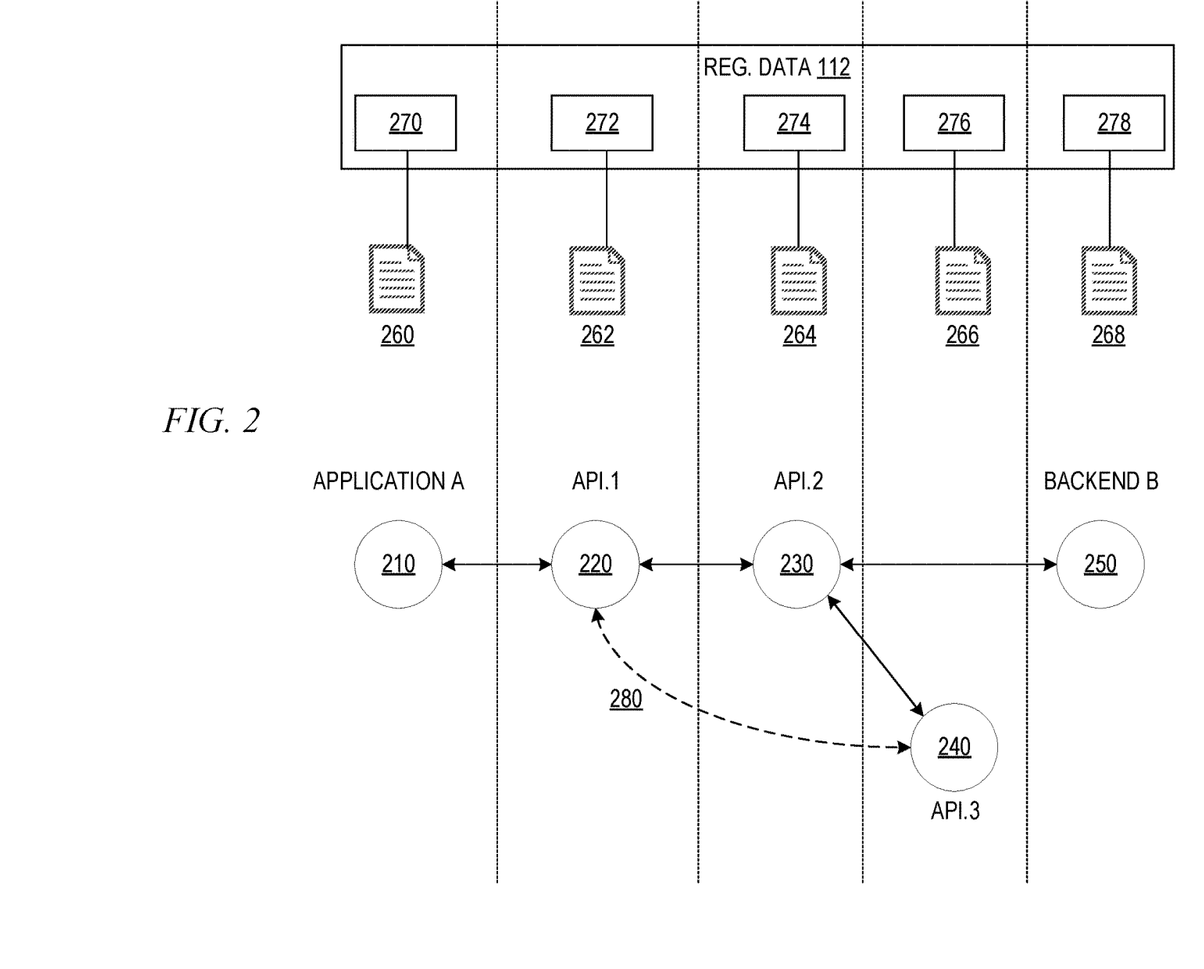
FIG. 2 is an example diagram illustrating a computer service invocation chain and corresponding transaction data collection in accordance with one illustrative embodiment.

FIG. 2 is an example diagram illustrating a computer service invocation chain and corresponding transaction data collection in accordance with one illustrative embodiment. For purposes of the description of FIG. 2, it is assumed that a pre-configuration operation has been performed to gather computing service registration data and a hierarchical computer model, e.g., DAG 122, has been created to represent the hierarchy of consumers and providers of computing services as shown in FIG. 2. The nodes 210-250 are nodes of a larger DAG (not shown) and represent a selected subset of nodes corresponding to a particular CS invocation chain identified by the SICOR computing tool 100. Each link between nodes 210-250 has associated registration data specifying the costs associated with transactions between the nodes. The transaction data 260-268 for each transaction between the nodes may be stored by each of the computer service provider computing systems, e.g., 170, 180, and 190, in the corresponding transaction data storages 172, 182, and 192, and reported to the SICOR computing tool 100 as discussed above, or otherwise incorporated into a blockchain data structure passed from system to system as part of the transactions. Each of the transaction data 260-268 may be correlated with portions 270-278 of the registration data in the CS registry 112 to identify costs of each transaction.

In the example shown in FIG. 2, an application A 210 initiates a transaction with API.1 220 which provides a computing service and corresponding computing functionality that application A wishes to utilize. Application A's view of the computing service invocation chain is that Application A has invoked API.1. Application A does not see any further levels downstream, e.g., API.2., API.3, or Backend B. As shown, API.1 further invokes API.2 230 which invokes API.3 240 and backend B 250. This shows the actual CS invocation chain from Application A to backend B. However, it is assumed that there is an existing association 280 between API.1 and API.3, e.g., a separate remuneration based association between API.1 and API.3. In determining the least cost path from application A to API.3, the least cost path will be along association or link 280 rather than through API.2. Thus, through the mechanisms of the illustrative embodiments, the usage metric data used by API.2 to obtain remuneration for its computing services from API.1, the usage metric data is updated to reflect the reduced cost of the association 280 between API.1 and API.3.

Figure 3:
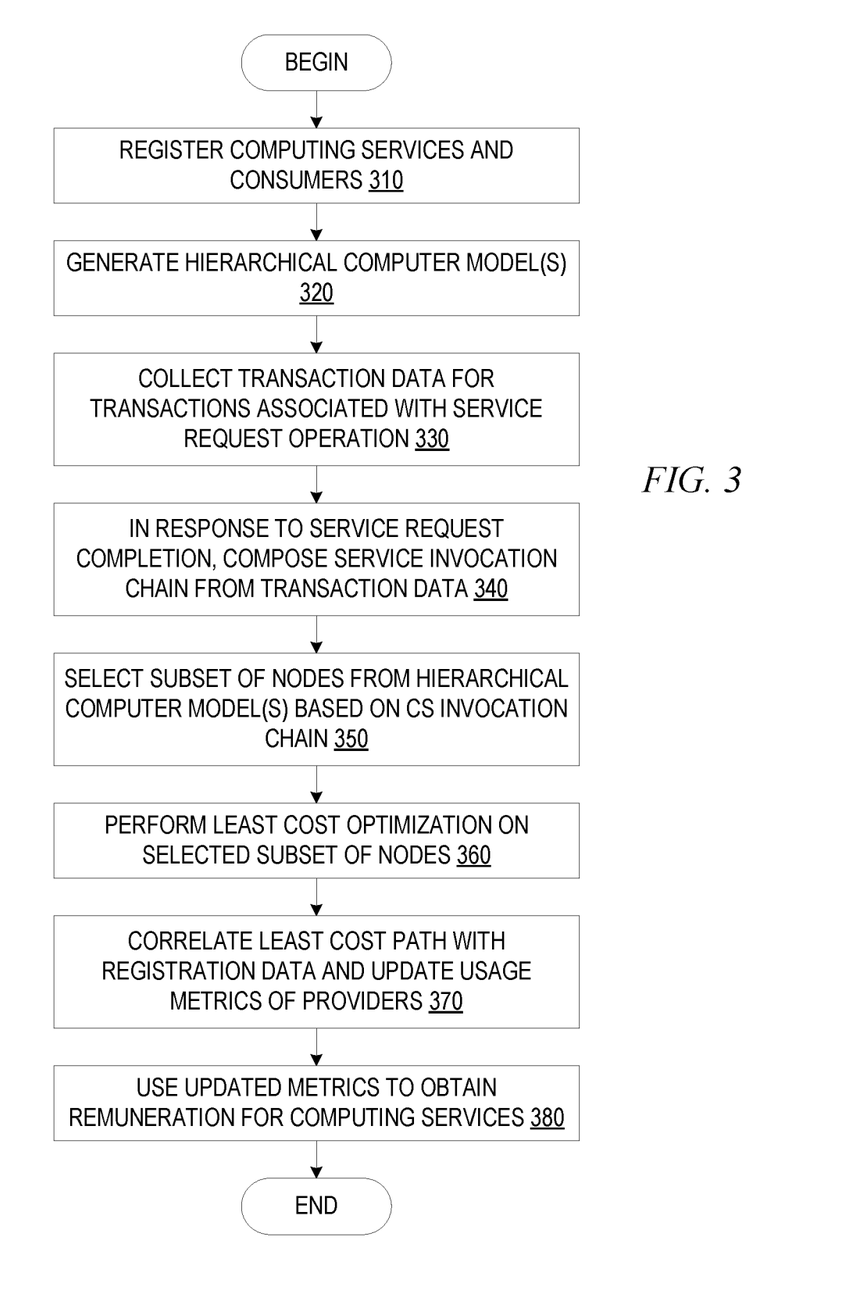
FIG. 3 is an example flowchart outlining an example operation of a service invocation chain optimized remuneration (SICOR) computing tool in accordance with one illustrative embodiment.

FIG. 3 presents a flowchart outlining example operations of elements of the present invention with regard to one or more illustrative embodiments. It should be appreciated that the operation outlined in FIG. 3 is specifically performed automatically by an improved computer tool of the illustrative embodiments and is not intended to be, and cannot practically be, performed by human beings either as mental processes or by organizing human activity. To the contrary, while human beings may, in some cases, initiate the performance of the operation set forth in FIG. 3, and may, in some cases, make use of the results generated as a consequence of the operations set forth in FIG. 3, the operation in FIG. 3 is specifically performed by the improved computing tool in an automated manner.

FIG. 3 is an example flowchart outlining an example operation of a service invocation chain optimized remuneration (SICOR) computing tool in accordance with one illustrative embodiment. As shown in FIG. 3, the operation starts with a pre-configuration operation that registers computing services and consumers (step 310). One or more hierarchical computer models are generated based on the registration data (step 320). Transaction data for transactions between consumers and providers of computing services are then collected for an initiated service request from an application (step 330). In response to a service request operation completion notification being received, a computing services invocation chain is composed based on the transaction data collected (step 340). A subset of nodes in the hierarchical computer model(s) is selected based on the CS invocation chain (step 350). A least cost path analysis or optimization is performed on the selected subset of nodes to find a least cost path from a start node to end node(s) of the CS invocation chain (step 360). The least cost path is correlated with the registration data for the nodes and associations between nodes so as to update the usage metrics for nodes in the CS invocation chain based on the least cost path (step 370). The updated usage metrics are then used by the nodes to obtain remuneration for their computing services in performing the operation (step 380). The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides improved computer functionality for monitoring, tracking, and updating usage configurations of computing services based on computing service invocation chains and optimization of remuneration to minimize costs to consumers of computing services. The improved computing tool implements mechanism and functionality, such as the SICOR computing tool 100 in FIG. 1, which cannot be practically performed by human beings either outside of, or with the assistance of, a technical environment, such as a mental process or the like. The improved computing tool provides a practical application of the methodology at least in that the improved computing tool is able to optimize remuneration based on computing service invocation chains and established associations between consumers and providers of computing services so as to minimize costs to consumers of computing services.

Figure 4:
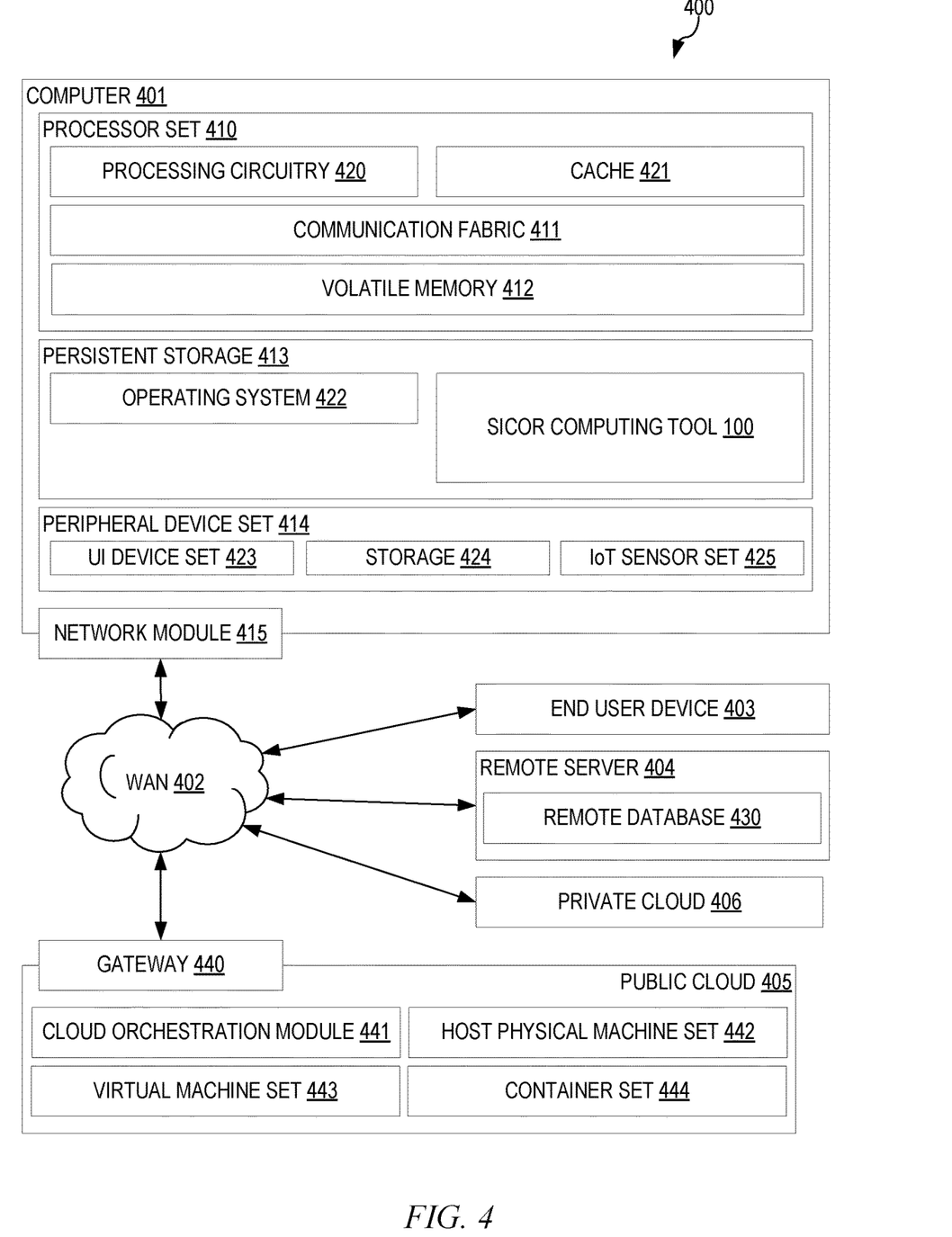
FIG. 4 is an example diagram of a distributed data processing system environment in which aspects of the illustrative embodiments may be implemented and at least some of the computer code involved in performing the inventive methods may be executed.

FIG. 4 is an example diagram of a distributed data processing system environment in which aspects of the illustrative embodiments may be implemented and at least some of the computer code involved in performing the inventive methods may be executed. That is, computing environment 400 contains an example of an environment for the execution of at least some of the computer code involved in performing the inventive methods, such as SICOR computing tool 100 in FIG. 1. In addition to block 100, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 200, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 200 in persistent storage 413.

Communication fabric 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 200 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

As shown in FIG. 4, one or more of the computing devices, e.g., computer 401 or remote server 404, may be specifically configured to implement a SICOR computing tool 100. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 401 or remote server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates optimizing of remuneration based on computing service invocation chains and established associations between consumers and providers of computing services.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing remuneration for computing services, comprising:
    registering a plurality of computing services with a service invocation chain optimized remuneration (SICOR) computing tool, wherein, for a computing service, registering comprises storing registration data comprising remuneration associations between the computing service and at least one of consumers or other computing services;
    generating, by the SICOR computing tool, a computer model based on the registration data for the plurality of computing services, wherein the computer model represents dependencies between consumers of computing services and providers of computing services;
    determining, by the SICOR computing tool, for a service request from a consumer, each individual transaction with each individual computing service in a service invocation chain associated with the service request;
    calculating, by the SICOR computing tool, a cost of each individual transaction of the service invocation chain associated with the service request; and
    optimizing, by the SICOR computing tool, the calculated cost of the service invocation chain associated with the service request based on applying an optimization algorithm to a cost function applied to a selected portion of the computer model corresponding to the service invocation chain.

2. The computer-implemented method of claim 1, wherein the registration data comprises at least one of a maximum number of computing service calls per time period, a cost per computing service call, and compute/storage costs for calls to the computing service.

3. The computer-implemented method of claim 1, wherein the computing services are application programming interfaces (APIs).

4. The computer-implemented method of claim 1, wherein the computer model comprises one or more directed acyclic graphs (DAGs), and wherein each node in the one or more DAGs represents an entity that at least one of a consumer of computing services or a providing of computing services, and an edge between two entities represents a remuneration association between the two entities.

5. The computer-implemented method of claim 4, wherein optimizing the calculated cost of the service invocation chain comprises identifying a direct association between a first consumer of a computing service in the service invocation chain, and a first provider of the computing service that is more than one level deeper in the DAG, from the first consumer of computing services, in the service invocation chain.

6. The computer-implemented method of claim 5, wherein optimizing the calculated cost of the service invocation chain comprises modifying a usage metric associated with the first provider, for the service invocation chain, to represent a cost of the direct association rather than an association between an intermediate consumer of the computing service and the first provider the computing service.

7. The computer-implemented method of claim 1, wherein determining each individual transaction with each individual computing service in a service invocation chain associated with the service request comprises correlating unique identifiers of consumers and providers of computing services to generate a sequence of transactions between consumers and providers of computing services that represent the service invocation chain.

8. The computer-implemented method of claim 1, wherein the computer model is a distributed blockchain based ledger.

9. The computer-implemented method of claim 1, wherein the computer model is dynamically updated in response to a new consumer or a new provider of computing services are registered with the SICOR computing tool.

10. The computer-implemented method of claim 1, wherein the computer model is a hierarchical computer model having nodes representing consumers and providers of computing services and edges representing associations between the consumers and providers of computing services.

11. A computer program product comprising a computer readable storage medium having a computer readable program stored therein, wherein the computer readable program, when executed on a computing device, causes the computing device to:

register a plurality of computing services with a service invocation chain optimized remuneration (SICOR) computing tool, wherein, for a computing service, registering comprises storing registration data comprising remuneration associations between the computing service and at least one of consumers or other computing services;

generate, by the SICOR computing tool, a computer model based on the registration data for the plurality of computing services, wherein the computer model represents dependencies between consumers of computing services and providers of computing services;

determine, by the SICOR computing tool, for a service request from a consumer, each individual transaction with each individual computing service in a service invocation chain associated with the service request;

calculate, by the SICOR computing tool, a cost of each individual transaction of the service invocation chain associated with the service request; and optimize, by the SICOR computing tool, the calculated cost of the service invocation chain associated with the service request based on applying an optimization algorithm to a cost function applied to a selected portion of the computer model corresponding to the service invocation chain.

12. The computer program product of claim 11, wherein the registration data comprises at least one of a maximum number of computing service calls per time period, a cost per computing service call, and compute/storage costs for calls to the computing service.

13. The computer program product of claim 11, wherein the computing services are application programming interfaces (APIs).

14. The computer program product of claim 11, wherein the computer model comprises one or more directed acyclic graphs (DAGs), and wherein each node in the one or more DAGs represents an entity that at least one of a consumer of computing services or a providing of computing services, and an edge between two entities represents a remuneration association between the two entities.

15. The computer program product of claim 14, wherein optimizing the calculated cost of the service invocation chain comprises identifying a direct association between a first consumer of a computing service in the service invocation chain, and a first provider of the computing service that is more than one level deeper in the DAG, from the first consumer of computing services, in the service invocation chain.

16. The computer program product of claim 15, wherein optimizing the calculated cost of the service invocation chain comprises modifying a usage metric associated with the first provider, for the service invocation chain, to represent a cost of the direct association rather than an association between an intermediate consumer of the computing service and the first provider the computing service.

17. The computer program product of claim 11, wherein determining each individual transaction with each individual computing service in a service invocation chain associated with the service request comprises correlating unique identifiers of consumers and providers of computing services to generate a sequence of transactions between consumers and providers of computing services that represent the service invocation chain.

18. The computer program product of claim 11, wherein the computer model is a distributed blockchain based ledger.

19. The computer program product of claim 11, wherein the computer model is dynamically updated in response to a new consumer or a new provider of computing services are registered with the SICOR computing tool.

20. An apparatus comprising:
at least one processor; and
at least one memory coupled to the at least one processor, wherein the at least one memory comprises instructions which, when executed by the at least one processor, cause the at least one processor to:

register a plurality of computing services with a service invocation chain optimized remuneration (SICOR) computing tool, wherein, for a computing service, registering comprises storing registration data comprising remuneration associations between the computing service and at least one of consumers or other computing services;

generate, by the SICOR computing tool, a computer model based on the registration data for the plurality of computing services, wherein the computer model represents dependencies between consumers of computing services and providers of computing services;

determine, by the SICOR computing tool, for a service request from a consumer, each individual transaction with each individual computing service in a service invocation chain associated with the service request;

calculate, by the SICOR computing tool, a cost of each individual transaction of the service invocation chain associated with the service request; and optimize, by the SICOR computing tool, the calculated cost of the service invocation chain associated with the service request based on applying an optimization algorithm to a cost function applied to a selected portion of the computer model corresponding to the service invocation chain.

* * * * *